US012573799B2

(12) United States Patent
Hung et al.

(10) Patent No.: US 12,573,799 B2
(45) Date of Patent: Mar. 10, 2026

(54) HIGH-FREQUENCY CONNECTOR ASSEMBLY

(71) Applicant: QuantumZ Inc., Kaohsiung (TW)

(72) Inventors: He-Tsung Hung, Kaohsiung (TW); Meng-Hua Tsai, Kaohsiung (TW); Wei Ting Lee, Kaohsiung (TW); Sin-Siang Wang, Kaohsiung (TW)

(73) Assignee: QuantumZ Inc., Kaohsiung City (TW)

( * ) Notice: Subject to any disclaimer, the term of this patent is extended or adjusted under 35 U.S.C. 154(b) by 343 days.

(21) Appl. No.: 18/391,556

(22) Filed: Dec. 20, 2023

(65) Prior Publication Data

US 2024/0405490 A1 Dec. 5, 2024

(30) Foreign Application Priority Data

May 30, 2023 (TW) ................................ 112120166

(51) Int. Cl.

| | |
|---|---|
| ***H01R 24/42*** | (2011.01) |
| ***H01R 13/405*** | (2006.01) |
| ***H01R 13/502*** | (2006.01) |
| ***H01R 24/70*** | (2011.01) |
| ***H01R 24/78*** | (2011.01) |

(52) U.S. Cl.

CPC ........... *H01R 24/42* (2013.01); *H01R 13/405* (2013.01); *H01R 13/502* (2013.01); *H01R 24/70* (2013.01); *H01R 24/78* (2013.01)

(58) Field of Classification Search

CPC .... H01R 24/42; H01R 13/405; H01R 13/502; H01R 24/70; H01R 24/78; H01R 12/73; H01R 13/6594; H01R 13/6585; H01R 13/6596; H01R 13/6474; H01R 13/652

See application file for complete search history.

(56) References Cited

U.S. PATENT DOCUMENTS

2020/0212634 A1 * 7/2020 Teruki .................... H01R 12/73

FOREIGN PATENT DOCUMENTS

| | | | | |
|---|---|---|---|---|
| CN | 110380289 A | * 10/2019 | ......... | H01R 13/6461 |
| CN | 113067176 A | * 7/2021 | ........... | H01R 13/502 |
| JP | 2013041771 A | * 2/2013 | | |
| JP | 5806700 B2 | * 11/2015 | ........... | H01R 12/716 |
| KR | 20240124212 A | * 8/2024 | ............. | H01R 13/46 |

* cited by examiner

*Primary Examiner* — Travis S Chambers

(74) *Attorney, Agent, or Firm* — CKC & Partners Co., LLC

(57) ABSTRACT

A high-frequency connector assembly includes a plurality of connection terminal groups, at least one first metal part, a plurality of second metal parts and an insulating shell. Each connection terminal group includes a male terminal and a female terminal, the male terminal is in contact with the female terminal to transmit signals, and the connection terminal groups are arranged along a first direction; the at least one first metal part extends along the first direction; the second metal parts are disposed between the plurality of connection terminal groups and extend along a second direction, in which each second metal part includes at least two metal pieces, and the at least two metal pieces are not connected to each other; the insulating shell carries the second metal parts, so that the at least one first metal part and the second metal parts are not in contact with each other.

16 Claims, 8 Drawing Sheets

HIGH-FREQUENCY CONNECTOR ASSEMBLY

RELATED APPLICATIONS

This application claims priority to Taiwan Application Serial Number 112120166, filed May 30, 2023, which is herein incorporated by reference.

BACKGROUND

Technical Field

The invention relates to connectors used for signal transmission, and particularly related to connectors for high-frequency signal transmission.

Description of Related Art

With the fast development of the communication industry, 5th generation mobile networks (5G) generation is coming and leads to demands for corresponding connectors.

Connectors are basic but essential components for electrical connection or signal transmission in systems or circuits, and act as the transmission medium between signals. However, in order to support signal transmission in higher frequency bands (such as 5G millimeter wave band) and achieve good transmission quality, the overall performance of the connectors need to be continuously improved to overcome problems of resonance, impedance mismatch, and electromagnetic interference (EMI). Other problems arise in millimeter wave communication transmission also considered.

SUMMARY

A high-frequency connector assembly includes a plurality of connection terminal groups, at least one first metal part, a plurality of second metal parts and an insulating shell. Each of the connection terminal groups comprises a male terminal and a female terminal, the male terminal is in contact with the female terminal to transmit signals, and the plurality of connection terminal groups are arranged along a first direction; the at least one first metal part extends along the first direction; the plurality of second metal parts are disposed between the plurality of connection terminal groups and extending along a second direction, in which each of the second metal parts comprises at least two metal pieces, and the at least two metal pieces are not connected to each other; the insulating shell carries the plurality of second metal parts, so that the at least one first metal part and the plurality of second metal parts are not in contact with each other.

According to another purpose of the invention is to provide a high-frequency connector assembly, including a male connector and a female connector. The male connector includes a male insulating shell, at least one first male metal body and a plurality of second male metal bodies. The male insulating shell carries a plurality of male terminals, in which the plurality of male terminals are arranged along a first direction; the at least one first male metal body extends along the first direction and disposed between the plurality of male terminals; the plurality of second male metal bodies extend along a second direction and disposed between the plurality of male terminals, in which each of the second male metal bodies includes at least two metal pieces, and the at least two metal pieces are not connected to each other. The female connector has a joint structure corresponding to the male connector, including a female insulating shell, at least one first female metal body and a plurality of second female metal bodies. The female insulating shell carries a plurality of female terminals, in which the plurality of female terminals are arranged along the first direction; the at least one first female metal body extends along the first direction and disposed between the plurality of female terminals; the plurality of second female metal bodies extend along the second direction and disposed between the plurality of female terminals, in which each of the second male metal bodies includes at least two metal pieces, and the at least two metal pieces are not connected to each other. Among them, the at least one first male metal body and the plurality of second male metal bodies are not in contact with each other, the at least one first female metal body and the plurality of second female metal bodies are not in contact with each other.

BRIEF DESCRIPTION OF THE DRAWINGS

In order to make the above and other objects, features, advantages and embodiments of the present invention easier to understand, the accompanying drawings are described as follows.

DETAILED DESCRIPTION

Embodiments of the present invention are discussed in detail below. However, it should be appreciated that the embodiments provide many applicable concepts that can be embodied in variety of specific contexts. The embodiments discussed and disclosed are for illustration only and are not intended to limit the scope of the invention.

Figure 1:
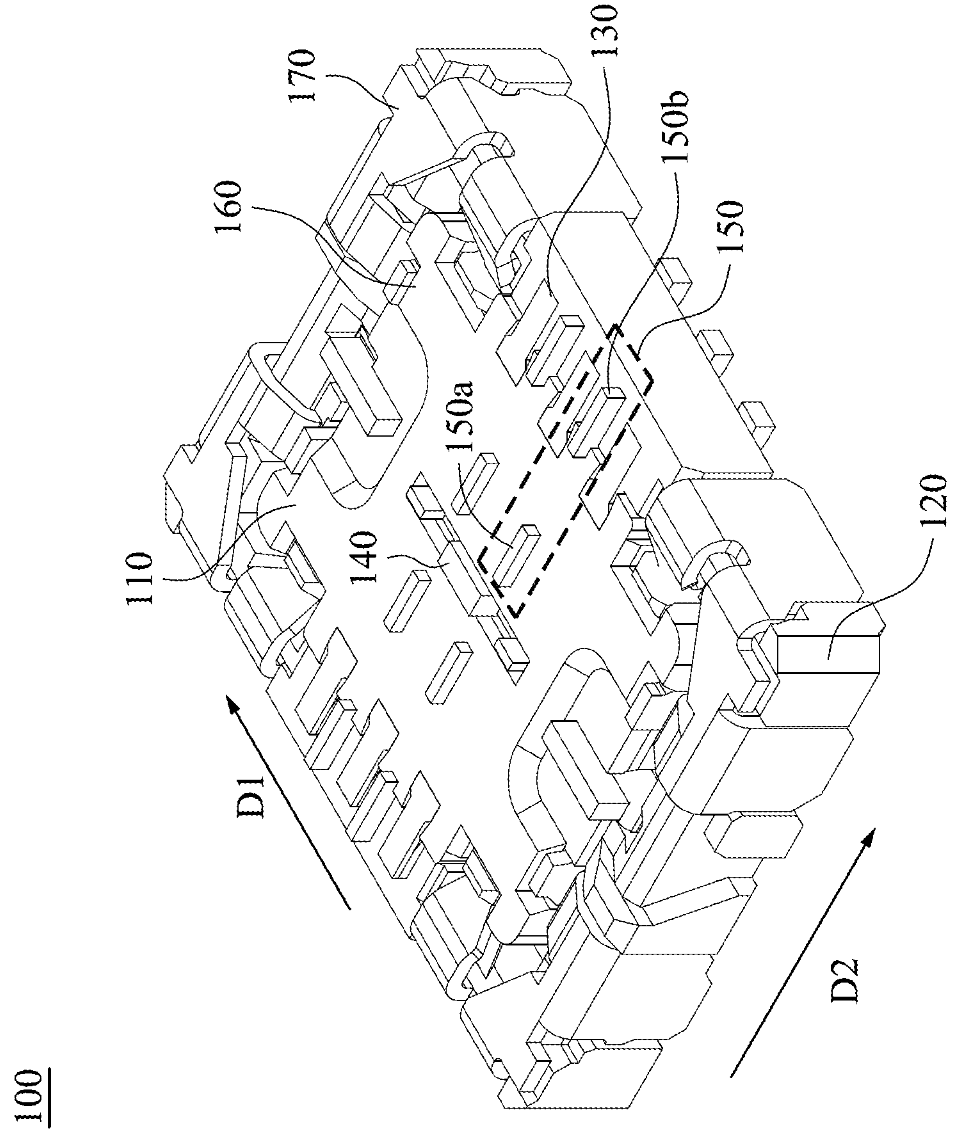
FIG. 1 is a schematic diagram of a high-frequency connector assembly according to an embodiment of the invention.

Referring to FIG. 1, FIG. 1 is a schematic diagram of a high-frequency connector assembly 100 in an embodiment of the invention. The high-frequency connector assembly 100 is composed of a male connector 110 and a female connector 120 corresponding to each other. The high-frequency connector assembly 100 is suitable for high-frequency (for example, millimeter wave band) signal transmission, which reduces losses caused by transmission signal reflection or impedance mismatch by using metal shielding and grounding. Therefore, signals can be transmitted more completely at high-frequencies. As shown in FIG. 1, the high-frequency connector assembly 100 includes connection terminal groups 130, a first metal part 140, second metal parts 150 and an insulating shell 160. Among them, the first metal part 140 and the second metal parts 150 respectively extend in a first direction D1 and a second direction D2 to serve as shields between the connection terminal groups 130 and to be electrically grounded, thereby improving voltage standing wave ratio (VSWR) of the high-frequency connector assembly 100 and improving signal interference between the connection terminal groups 130 during signal transmission. In some embodiments, the high-frequency connector assembly 100 of the invention can be applied in combination with flexible print circuit (FPC) boards, so that the high-frequency connector assembly 100 may be thinner, lighter and more mobile, and may also be bent to a certain extent with the flexible print circuit boards to increase the applicability of the high-frequency connector assembly 100.

Please referring to FIG. 1, the connection terminal groups 130 are composed of male terminals of the male connector 110 and female terminals of the female connector 120. Among them, each of the connection terminal groups 130 includes a male terminal and a female terminal, and the connection terminal groups 130 are arranged along the first direction D1. In some embodiments, compared to arranging ground pin in any connection terminal groups 130, arranging the ground pin in the middle of the connection terminal groups 130 can achieve relatively less noise interference.

Please referring to FIG. 1, the first metal part 140 extends along the first direction D1 and disposed in the insulating shell 160. In this embodiment, the first metal part 140 is buried or plugged in the holes of the insulating shell 160. The top and the bottom portions of the first metal part 140 are exposed through the holes of the insulating shell 160, and the top and the bottom portions of the first metal part 140 are electrically grounded. In this way, the first metal part 140, the male connector 110 and the female connector 120 of the high-frequency connector assembly 100 are grounded together, which increasing transmission paths of currents (signals), thereby improving the voltage standing wave ratio of the high-frequency connector assembly 100. In some embodiment, the first metal part 140 may have more portions exposed from the insulating shell 160 and electrically grounded. In some embodiment, the top and the bottom surfaces of the first metal part 140 may be aligned with the top and bottom surfaces of the insulating shell 160, being slightly recessed or protruding from the top and bottom surfaces of the insulating shell 160. Therefore, the top and the bottom surfaces of the first metal part 140 may be recessed in the holes of the insulating shell 160 or protruding outside the holes of the insulating shell 160, the present invention is not limited thereto.

In this embodiment, the top and the bottom portions of the first metal part 140 have a concave-convex structure. At least two portions of the concave-convex structure protrude outside the holes of the insulating shell 160 and are electrically grounded. In some embodiments, the first metal part 140 may have different shapes to accommodate different connector structures. For example, the front end, back end, top or bottom of the first metal part 140 may have a convex or concave structure for the first metal part 140 and the connectors to fit into each other, the present invention is not limited thereto. In some embodiments, the first metal part 140 may be an integrated structure or a component composed of multiple parts. In addition, although only one first metal part 140 is shown in FIG. 1, more first metal parts 140 may be provided as needed.

Please referring to FIG. 1, the second metal parts 150 are disposed between the connection terminal groups 130, extend along the second direction D2 perpendicular to the first direction D1, and are disposed in the insulating shell 160. In this embodiment, the top and the bottom portions of the second metal parts 150 are exposed through holes (e.g which disposed between the connection terminal groups 130 and the first metal parts 140) and slots (e.g which disposed between adjacent connection terminal groups 130) of the insulating shell 160, and the top and the bottom portions of the second metal parts 150 are electrically grounded. In this way, the second metal parts 150 may form shields between the connection terminal groups 130 when the male connector 110 and the female connector 120 are joined to each other, thereby improving signal interference between the connection terminal groups 130, the signals may be transmitted more efficiently. The second metal parts 150 may have more parts exposed from the insulating shell 160 and electrically grounded, and the present invention is not limited thereto. In some embodiment, the top and the bottom surfaces of the second metal parts 150 may be aligned with the top and bottom surfaces of the insulating shell 160, being slightly recessed or protruding from the top and bottom surfaces of the insulating shell 160. Therefore, the top and the bottom surfaces of the second metal parts 150 may be recessed in the holes/slots of the insulating shell 160 or protruding from the holes/slots of the insulating shell 160. In addition, although only four second metal parts 150 are shown in FIG. 1, more second metal parts 150 may actually be provided as needed. In some embodiment, the second metal parts 150 may have different shapes to accommodate different connector structures. For example, the front end, back end, top or bottom of the second metal parts 150 may have a convex or concave structure for the second metal parts 150 and the connectors to fit into each other, the present invention is not limited thereto.

Figure 2:
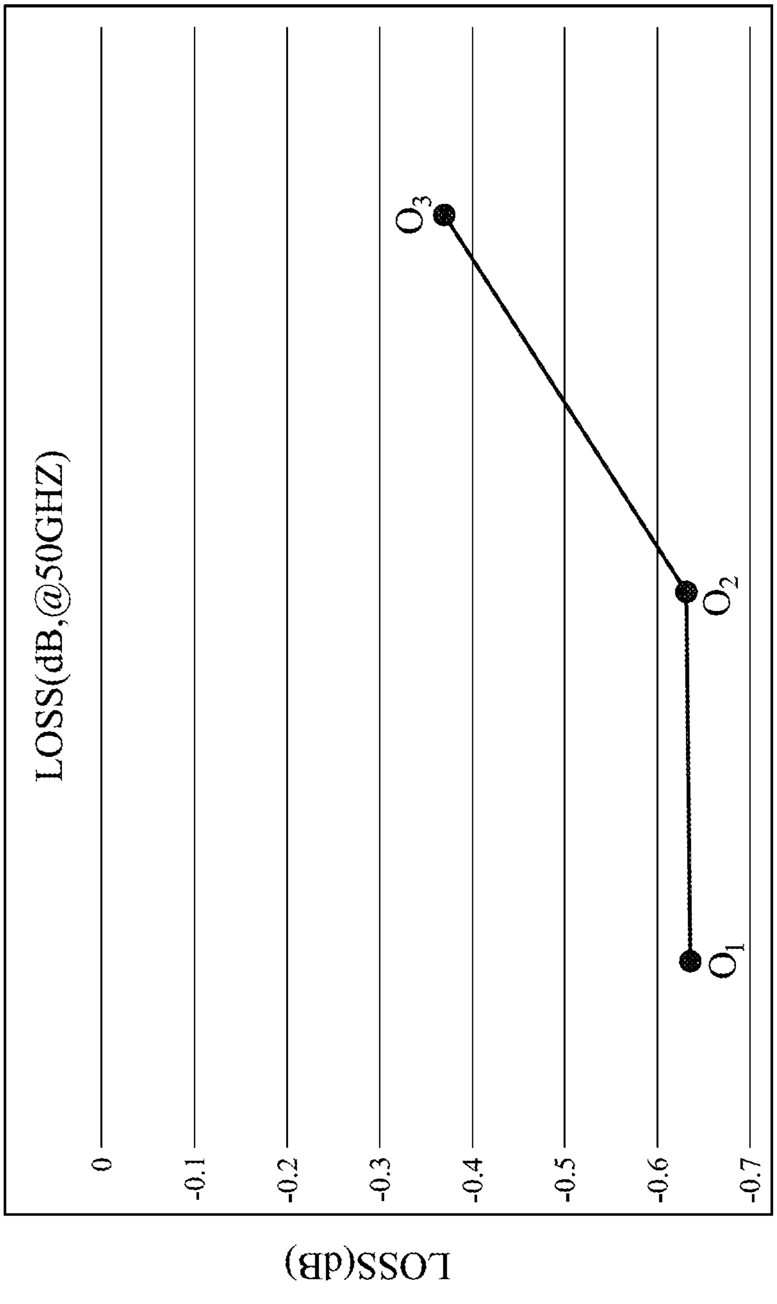
FIG. 2 is a schematic diagram of the impact of a connection relationship between a first metal part and second metal parts on loss according to an embodiment of the invention.

Please referring to FIG. 1, in this embodiment, each of the second metal parts 150 is composed of a metal piece 150*a* and a metal piece 150*b*, and the metal piece 150*a* and the metal piece 150*b* are not connected to each other. Among them, the metal piece 150*a* extends along the second direction D2 and is disposed between the connection terminal groups 130 and the first metal part 140, and the metal piece 150*b* extends along the second direction D2 and is disposed between the adjacent connection terminal groups 130. In this embodiment, a distance between the metal piece 150*a* and the metal piece 150*b* is at least 0.07λ to obtain better frequency response, in which λ is a wavelength of the high-frequency signal. For example, when the operating frequency of the high-frequency signal is 50 GHz, and the wavelength of the high-frequency signal is 3.53 mm, the distance should be at least 0.25 mm (0.07*3.53 mm). Although only each of the second metal parts 150 composed of two metal pieces (i.e. the metal piece 150*a* and the metal piece 150*b*) is shown in FIG. 2, in fact, each of the second metal parts 150 can be composed of more metal pieces as needed, the present invention is not limited thereto. In some embodiment, the metal piece 150*a* and the metal piece 150*b* of each second metal part 150 may be integrally formed structures, or may be structure composed of multiple components, and the present invention is not limited thereto.

In this embodiment, FIG. 2 shows the impact of the connection relationship between the first metal part 140 and the second metal parts 150 on the loss when the operating frequency is 50 GHz. In FIG. 2, the reference point $O_1$ means that the first metal part 140 and the second metal parts 150 are connected to each other, and there is no distance between the metal piece 150*a* and the metal piece 150*b* of each second metal part 150; the reference point $O_2$ means that the first metal part 140 and the second metal part 150 are not connected to each other, and there is no distance between the metal piece 150*a* and the metal piece 150*b* of each second metal part 150; the reference point $O_3$ means that the first metal part 140 and the second metal part 150 are not connected to each other, and there is a distance between the metal piece 150*a* and the metal piece 150*b* of each second metal part 150. It can be found from FIG. 2 that compared with the reference points $O_1$ and $O_2$, the reference point $O_3$ has smaller loss. In other word, the loss can be reduced when the first metal part 140 and the second metal part 150 are not connected to each other, and there is the distance between the metal piece 150*a* and the metal piece 150*b* of each second metal parts 150.

Figure 3:
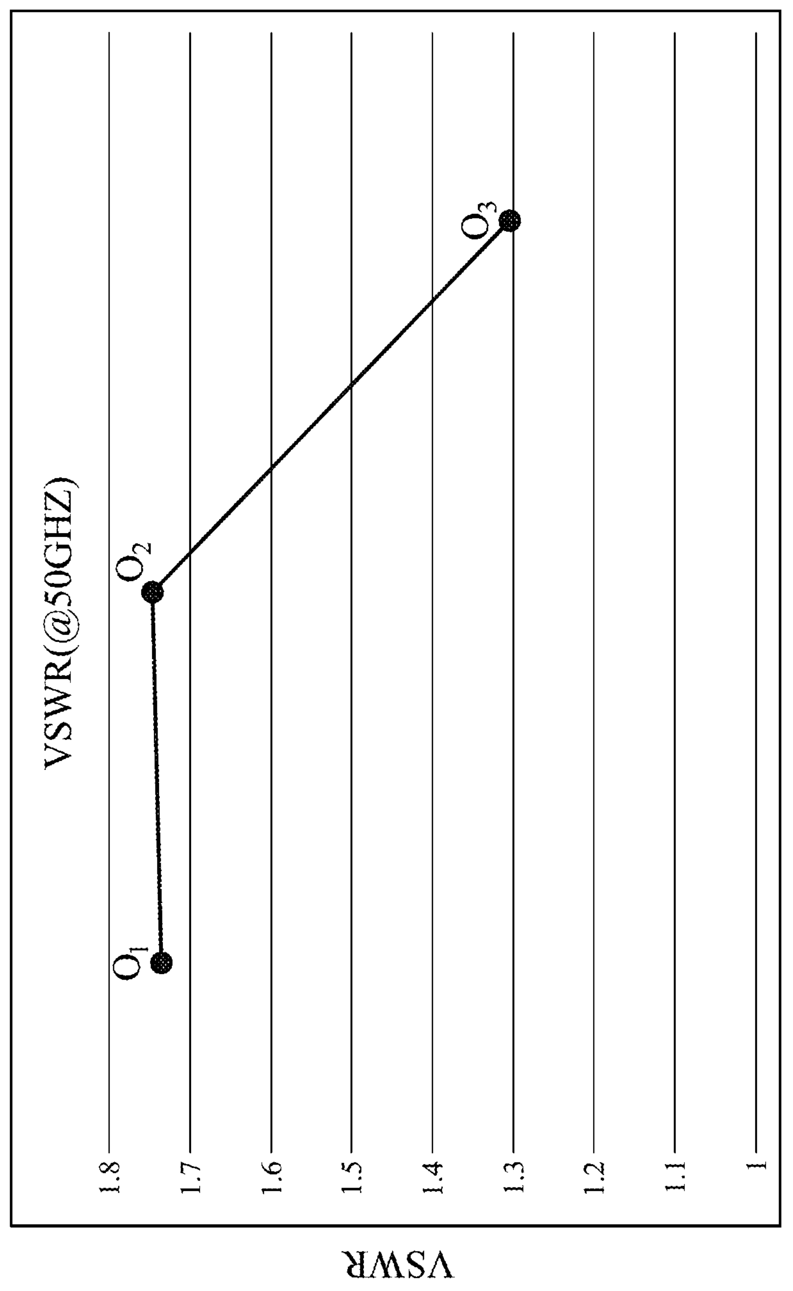
FIG. 3 is a schematic diagram of the impact of the connection relationship between the first metal part and the second metal parts on voltage standing wave ratio (VSWR) according to an embodiment of the invention.

In this embodiment, FIG. 3 shows the impact of the connection relationship between the first metal part 140 and the second metal parts 150 on the voltage standing wave ratio when the operating frequency is 50 GHz. In FIG. 3, the reference point $O_1$ means that the first metal part 140 and the second metal parts 150 are connected to each other, and there is no distance between the metal piece 150*a* and the metal piece 150*b* of each second metal part 150; the reference point $O_2$ means that the first metal part 140 and the second metal parts 150 are not connected to each other, and there is no distance between the metal piece 150*a* and the metal piece 150*b* of each second metal part 150; the reference point $O_3$ means that the first metal part 140 and the second metal parts 150 are not connected to each other, and there is a distance between the metal piece 150*a* and the metal piece 150*b* of each second metal part 150. It can be found from FIG. 2 that compared with the reference points $O_1$ and $O_2$, the voltage standing wave ratio of the reference point $O_3$ is closer to 1. In other word, the voltage standing wave ratio can be closer to 1 when the first metal part 140 and the second metal parts 150 are not connected to each other, and there is the distance between the metal piece 150*a* and the metal piece 150*b* of each second metal part 150. This means less signal reflection, and better impedance matching.

Figure 4:
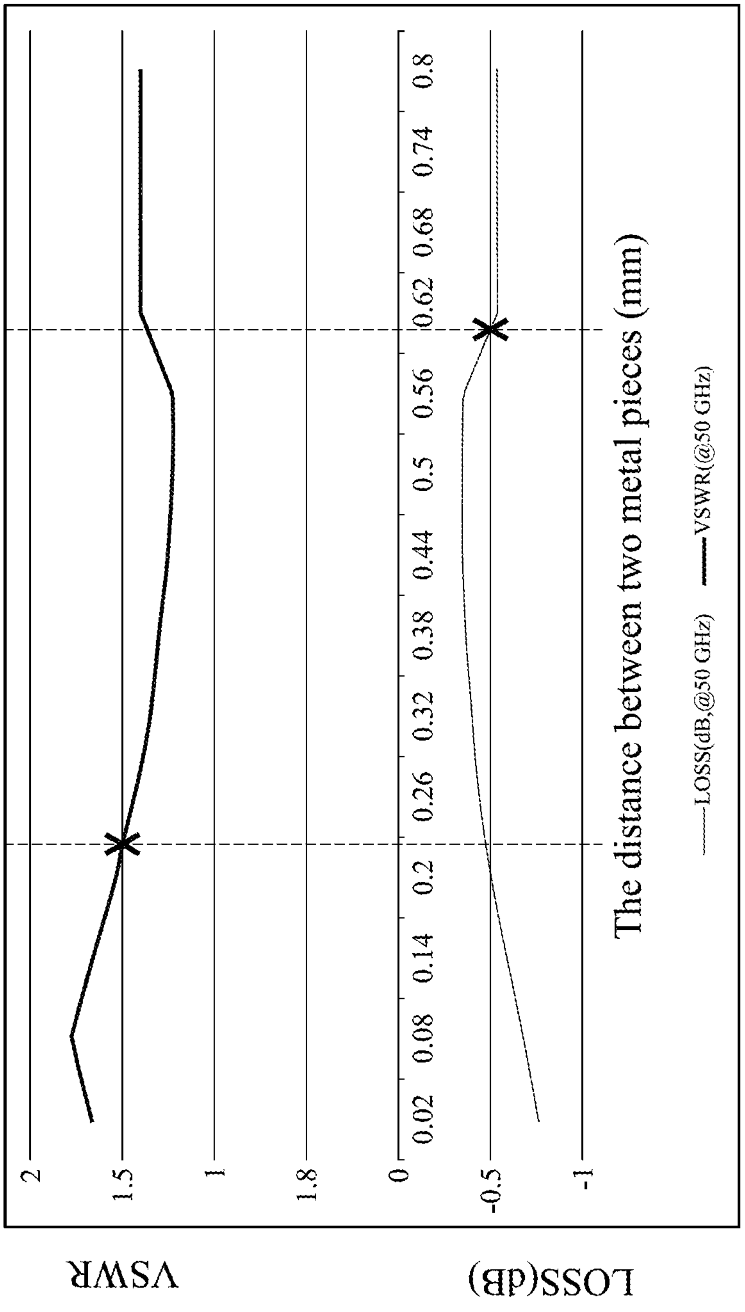
FIG. 4 is a schematic diagram of the impact of a distance between two metal pieces of the second metal parts on the loss and the voltage standing wave ratio according to an embodiment of the invention.

In this embodiment, FIG. 4 further illustrates the impact of the distance between the metal piece 150*a* and the metal piece 150*b* of each second metal part 150 on the loss and the voltage standing wave ratio when the operating frequency is 50 GHz. It can be found from FIG. 4 that when the distance between the metal piece 150*a* and the metal piece 150*b* is between 0.25 mm to 0.62 mm, there is smaller loss and the voltage standing wave ratio is closer to 1, resulting in better frequency response. For example, in this embodiment, the operating frequency is 50 GHz and the wavelength is 3.53 mm, the distance should be at least 0.25 mm (0.07*3.53 mm) to obtain the better frequency response.

Please referring to FIG. 1, the insulating shell 160 is composed of a male insulating shell of the male connector 110 and a female insulating shell of the female connector 120, and configured to carries the connection terminal groups 130. In other word, the male insulating shell of the male connector 110 carries the male terminals, the female insulating shell of the female connector 120 carries the female terminals, and the male terminals and the female terminals are joined correspondingly to each other to form the connection terminal groups 130. In this embodiment, the first metal part 140 and the second metal parts 150 are separated from each other by the insulating shell 160 so that the first metal part 140 and the second metal parts 150 do not contact each other.

In the embodiment shown in FIG. 1, the high-frequency connector assembly 100 further includes a metal shell 170 substantially covering the insulating shell 160. The metal shell 170 is composed of a metal shell of the male connector 110 and a metal shell of the female connector 120.

Figure 5:
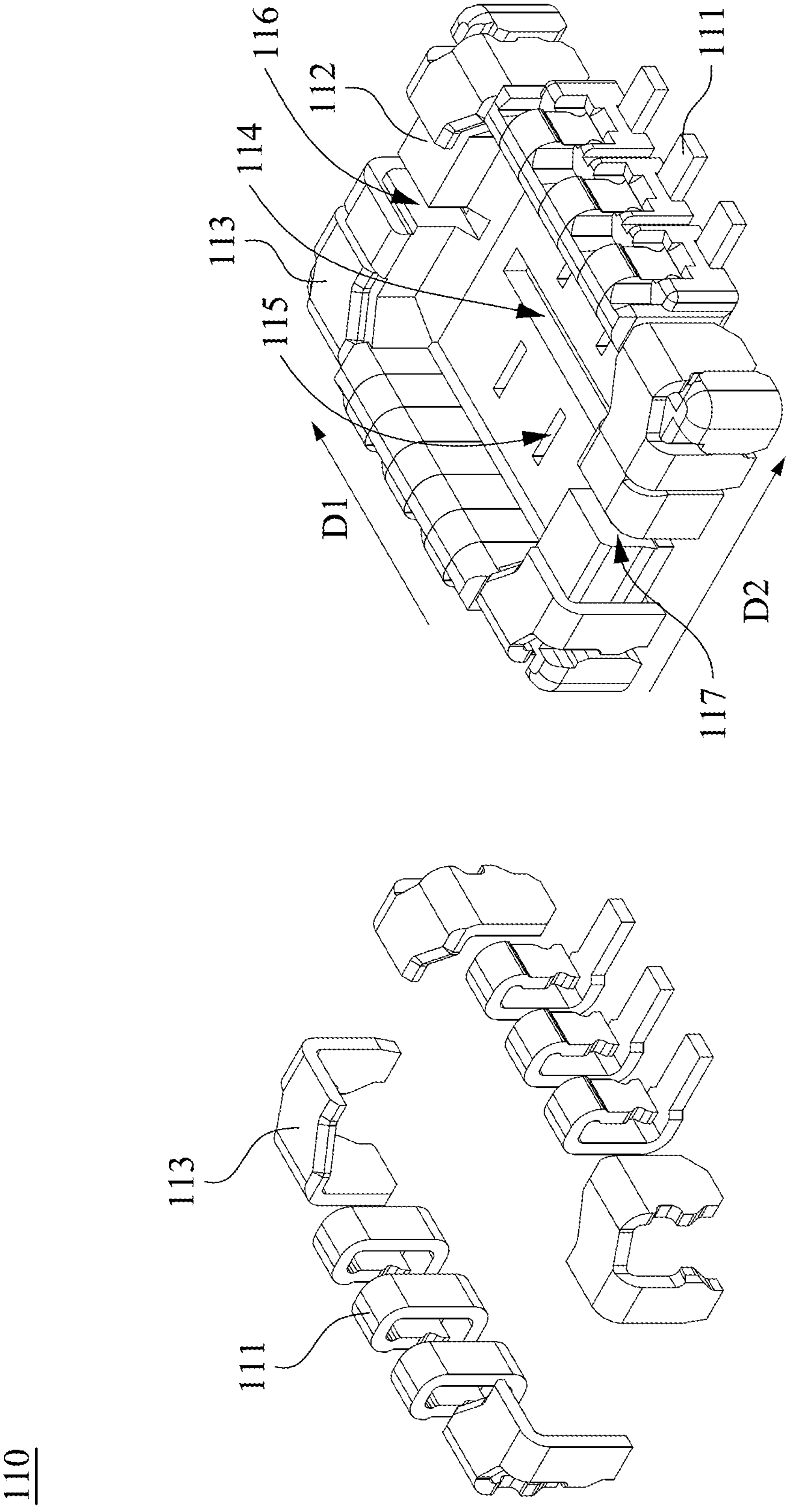
FIG. 5 is a schematic diagram of metal structure of the male connector and the male connector including a male insulating shell according to an embodiment of the invention.
Figure 6:
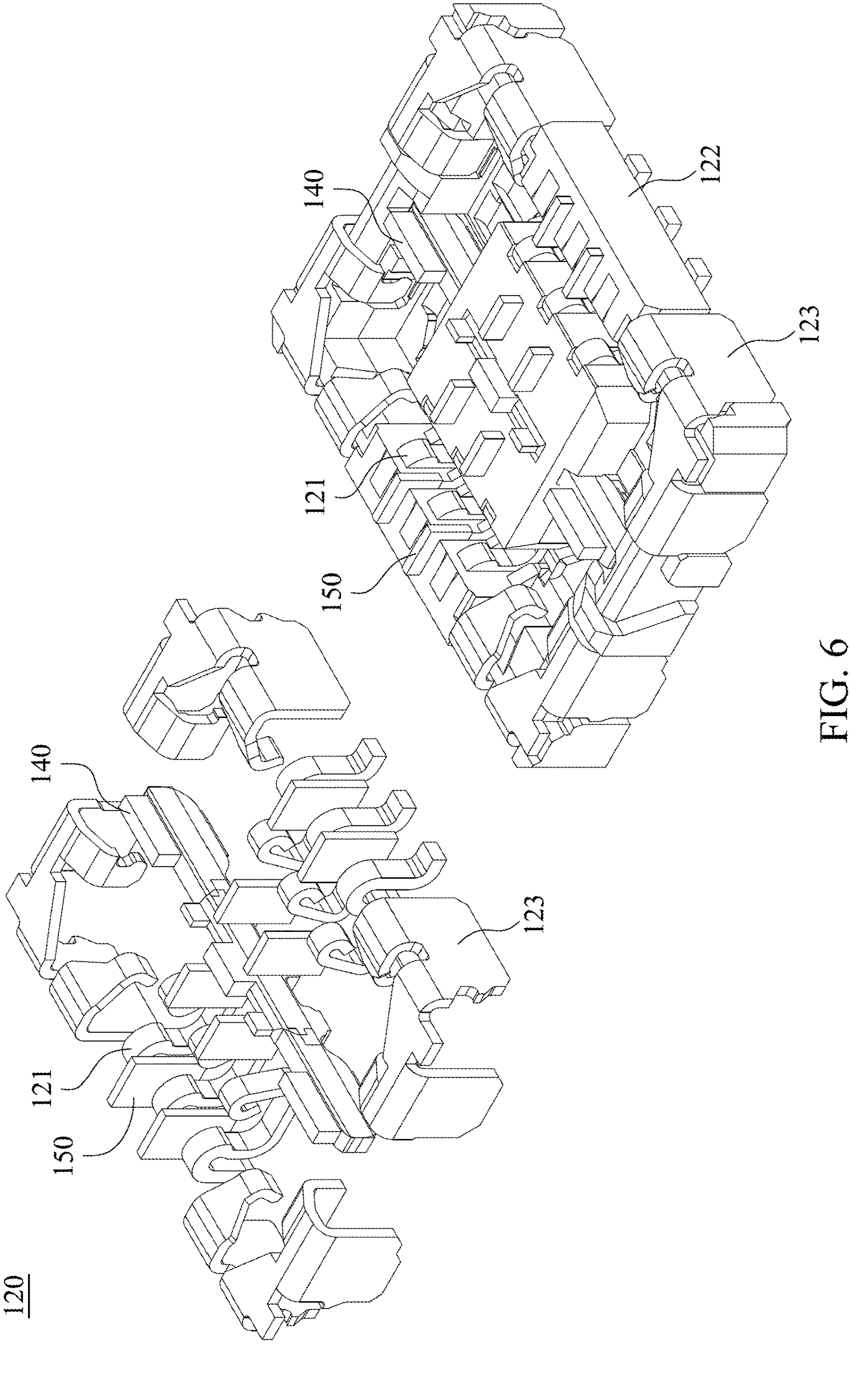
FIG. 6 is a schematic diagram of metal structure of the female connector and the female connector including a female insulating shell according to an embodiment of the invention.

According to the above content, FIG. 5 and FIG. 6 respectively illustrate schematic diagrams of the male connector 110 and the female connector 120 in accordance with the embodiment of the invention. The male connector 110 and the female connector 120 illustrated in FIG. 5 and FIG. 6 can be used to implement the high-frequency connector assembly 100 shown in FIG. 1, and other possible variations can also be adopted without exceeding the scope of the disclosure.

Please referring to FIG. 5, the left side in FIG. 5 is a schematic diagram of the metal structure of the male connector 110 according to the embodiment of the invention, which includes the male terminals 111 and the male metal shell 113. The right side in FIG. 5 is a schematic diagram of the male connector 110 including the male insulating shell 112 according to the embodiment of the invention. The male insulating shell 112 is used to carry the metal structure (which includes the male terminals 111 and the male metal shell 113) illustrated in the left side of FIG. 5. Specifically, the male insulating shell 112 carries the male terminals 111 and the male metal shell 113, and the male insulating shell 112 is substantially covered by the male metal shell 113. In addition, the male insulating shell 112 illustrated in the right side of FIG. 5 has a hole 114, a groove 116 and a groove 117 extending along the first direction D1, and holes 115 extending along the second direction D2. In this embodiment, the hole 114, the groove 116 and the groove 117 are provided for the first metal part 140 to be inserted accordingly, and the holes 115 are provided for the second metal part 150 to be inserted accordingly. Specifically, the tops and the bottoms of the first metal part 140 and the second metal parts 150 are exposed from these holes and grooves, and electrically grounded.

Please referring to FIG. 6, the left side in FIG. 6 is a schematic diagram of the metal structure of the female connector 120 according to the embodiment of the invention, which includes the female terminals 121, the female metal shell 123, the first metal part 140 and the second metal parts 150. The right side in FIG. 6 is a schematic diagram of the female connector 120 including the female insulating shell 122 according to the embodiment of the invention. The female insulating shell 122 is used to carry the metal structure (which includes the female terminals 121, the female metal shell 123, the first metal part 140 and the second metal part 150) illustrated in the right side of FIG. 6. The female insulating shell 122 carries the female terminals 121 and the female insulating shell 122 is substantially covered by the female metal shell 123. In this embodiment, the first metal part 140 and the second metal part 150 are respectively arranged in the first direction D1 and the second direction D2 to serve as the shields between the connection terminal groups 130 when the male connector 110 and the female connector 120 are jointed to each other correspondingly.

In this embodiment, the tops and the bottoms of the first metal part 140 and the second metal parts 150 both beyond the female terminals 121, the female insulating shell 122 and the female metal shell 123, and are electrically grounded when the male connector 110 and the female connector 120 are jointed to each other correspondingly. It should be understood that in some embodiments, the top and the bottom surfaces of the first metal part 140 and the second metal parts 150 may be aligned with the top and bottom surfaces of the female insulating shell 122, being slightly recessed or protruding from the top and bottom surfaces of the female insulating shell 122. Therefore, the top and the bottom surfaces of the first metal part 140 and the second metal parts 150 may be recessed in the holes/slots of the female insulating shell 122 or protruding from the holes/slots of the female insulating shell 122.

In addition, although the first metal part 140 and the second metal parts 150 are both disposed in the female connector 120, in some embodiment, the first metal part 140 and the second metal parts 150 may be disposed in the male connector 110. In another embodiment, one of the first metal part 140 and the second metal parts 150 is disposed in the male connector 110, and the other is disposed in the female connector 120. In yet another embodiment, both male connector 110 and the female connector 120 are equipped with the first metal part 140 and the second metal parts 150. It should be understood that changes and modifications regarding the placement of the first metal part 140 and the second metal parts 150 are within the scope of the present invention.

Figure 7:
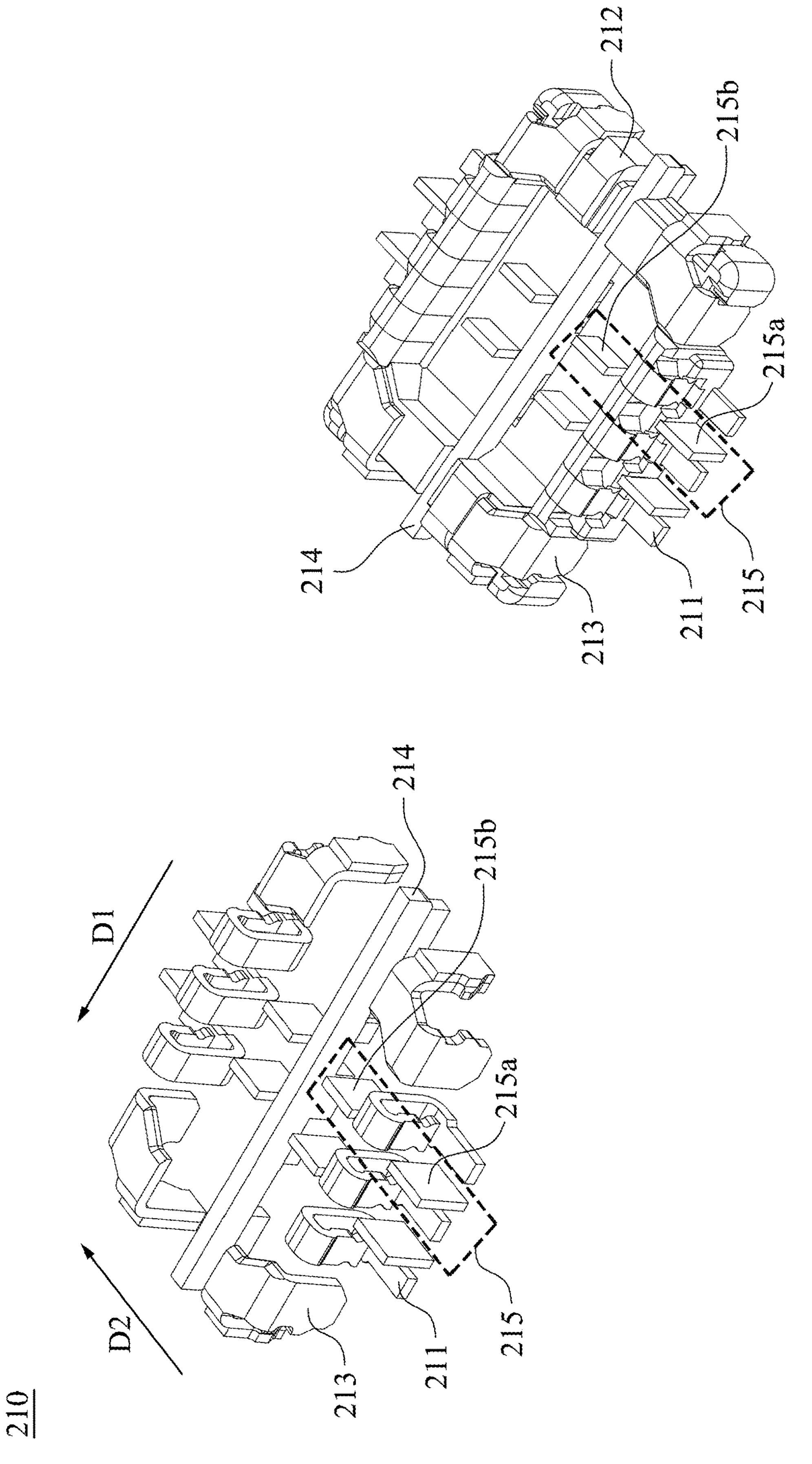
FIG. 7 is a schematic diagram of metal structure of the male connector and the male connector including the male insulating shell according to another embodiment of the invention.
Figure 8:
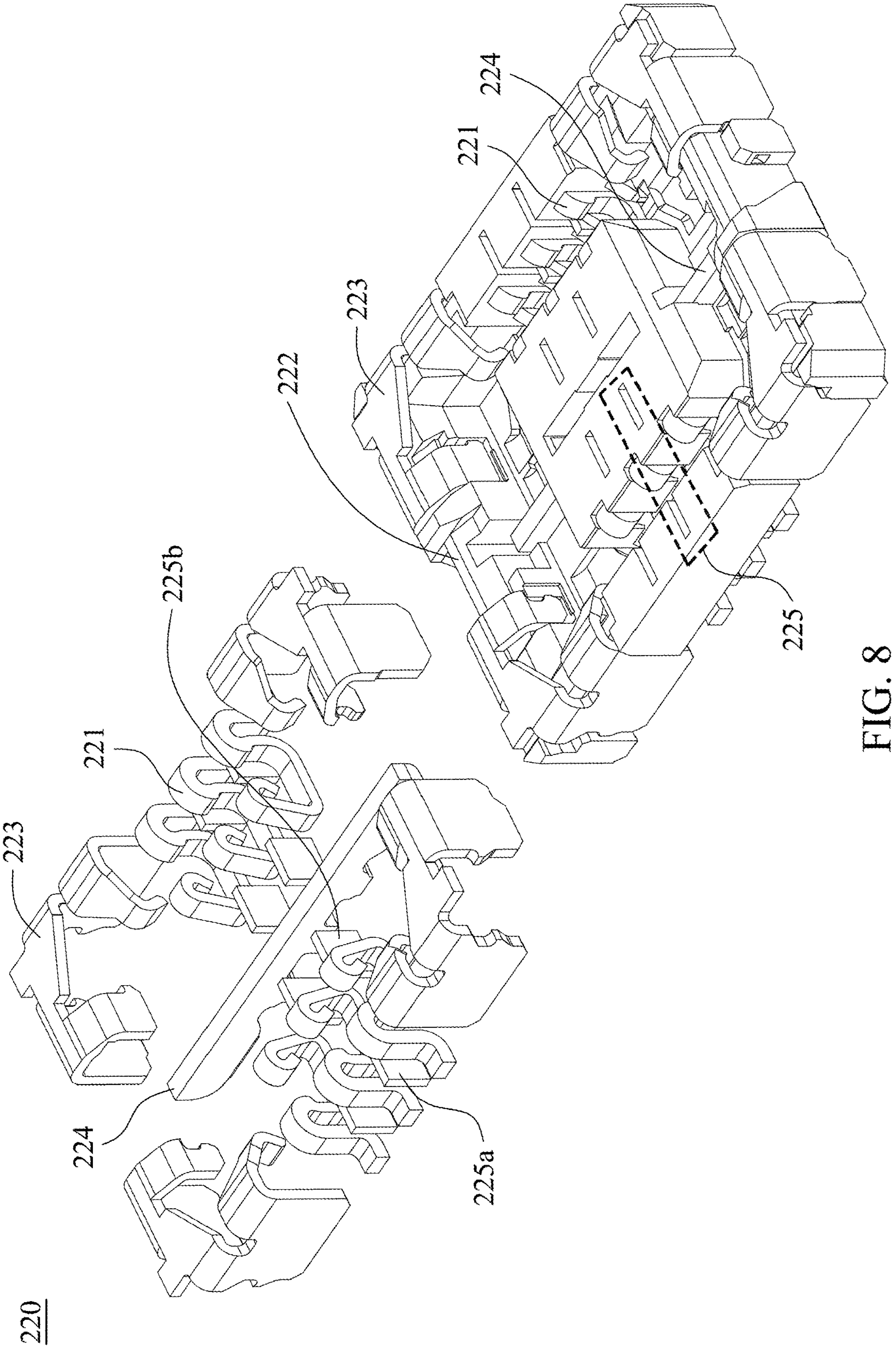
FIG. 8 is a schematic diagram of metal structure of the female connector and the female connector including the female insulating shell according to another embodiment of the invention.

In FIG. 7 and FIG. 8, the male connector 210 and the female connector 220 are shown according to another embodiment of the invention. The first metal part 140 shown in FIG. 1 and FIG. 6 is divided into a first male metal body 214 and a first female metal body 224 respectively disposed in the male connector 210 and the female connector 220, and both first male metal body 214 and the first female metal body 224 are electrically grounded. Each of the second metal parts 150 shown in FIG. 1 and FIG. 6 is divided into second male metal bodies 215 and second female metal bodies 225 respectively disposed in the male connector 210 and the female connector 220, and each of the second male metal bodies 215 and the second female metal bodies 225 are electrically grounded. It should be understood that the male connector 210 and the female connector 220 shown in FIG. 7 and FIG. 8 can be used to implement the high-frequency connector assembly 100 shown in FIG. 1, and other possible variations can also be adopted without exceeding the scope of the disclosure.

Please referring to FIG. 7, the left side in FIG. 7 is a schematic diagram of the metal structure of the male connector 210 according to another embodiment of the invention. The metal structure of the male connector 210 includes male terminals 211, a male metal shell 213, a first male metal body 214 and second male metal bodies 215, in which each of the second male metal bodies 215 includes a metal piece 215*a* and a metal piece 215*b*. The metal piece 215*a* and the metal piece 215*b* are not connected to each other, and a distance between the metal piece 215*a* and the metal piece 215*b* is at least 0.07λ to obtain better frequency response, in which λ is a wavelength of the operating frequency. For example, when the operating frequency is 50 GHz, and the wavelength is 3.53 mm, the distance should be at least 0.25 mm (0.07*3.53 mm). The right side in FIG. 7 is a schematic diagram of the male connector 210 including the male insulating shell 212 according to another embodiment of the invention. The male insulating shell 212 carries the metal structure (which includes the male terminals 211, the male metal shell 213, the first male metal body 214 and the second male metal bodies 215) shown in the left side of FIG. 7.

Please referring to FIG. 8, the left side in FIG. 8 is a schematic diagram of the metal structure of the female connector 220 according to another embodiment of the invention, which includes female terminals 221, a female metal shell 223, a first female metal body 224 and second female metal bodies 225, in which each of the second male metal bodies 215 includes a metal piece 225*a* and a metal piece 225*b*. The metal piece 225*a* and the metal piece 225*b* are not connected to each other, and a distance between the metal piece 225*a* and the metal piece 225*b* is at least 0.07λ to obtain better frequency response, in which λ is a wavelength of the operating frequency. For example, when the operating frequency of the high-frequency signal is 50 GHz, and the wavelength is 3.53 mm, the distance should be at least 0.25 mm (0.07*3.53 mm). The right side in FIG. 8 is a schematic diagram of the female connector 220 including the female insulating shell 222 according to another embodiment of the invention. The female insulating shell 222 carries the metal structure (which includes the female terminals 221, the female metal shell 223, the first female metal body 224 and the second female metal bodies 225) shown in the left side of FIG. 8.

In the embodiment shown in FIG. 7 and FIG. 8, the first male metal body 214 and the first female metal body 224 are joined correspondingly to each other to form the first metal part 140 shown in FIG. 1 while the male connector 210 and the female connector 220 are joined to each other. The first metal part 140 is exposed from the insulating shell 160 (which is shown in FIG. 1) and electrically grounded. The second male metal bodies 215 and the second female metal bodies 225 are joined correspondingly to each other to form the second metal parts 150 which are shown in FIG. 1, in which the second metal parts 150 are exposed from the insulating shell 160 and electrically grounded. Therefore, the shields can be implemented between the connection terminal groups 130 in the first direction D1 and the second direction D2. In summary, the combination and position arrangement of the first metal part 140 and the second metal part 150 can be changed and modified without departing from the spirit and technical scope of the present invention.

The high-frequency connector assembly according to the present invention is suitable for high-frequency (for example, millimeter wave frequency band) signal transmission, which reduces losses caused by transmission signal reflection, high-frequency resonance or impedance mismatch by using the shielding and grounding characteristics of metal parts, thereby effectively transmitting signals under the high-frequency transmission. In summary, the high-frequency connector assembly of the invention can transmit signals at high frequencies, and use metal parts to improve problems such as high-frequency resonance, signal distortion, and noise interference that connectors may encounter at high frequencies, thereby improving the transmission quality.

However, the descriptions are only preferred embodiments of the invention as mentioned above, and should not limit the scope of implementation of the invention. Anyone with ordinary knowledge in this technical field can make various modifications and modifications without departing from the spirit and scope of the invention. Therefore, the protection scope of the present invention shall be determined by the appended patent scope.

What is claimed is:

1. A high-frequency connector assembly, comprising:

a plurality of connection terminal groups, wherein each of the plurality of connection terminal groups comprises a male terminal and a female terminal, the male terminal is in contact with the female terminal to transmit signals, and the plurality of connection terminal groups are arranged along a first direction;

at least one first metal part extending along the first direction;

a plurality of second metal parts disposed between the plurality of connection terminal groups and extending along a second direction, wherein each of the plurality of second metal parts comprises at least two metal pieces, and the at least two metal pieces are not connected to each other; and an insulating shell carrying the plurality of second metal parts, so that the at least one first metal part and the plurality of second metal parts are not in contact with each other.

2. The high-frequency connector assembly of claim 1, wherein the at least one first metal part and the plurality of second metal parts are disposed in the insulating shell, and each of the at least one first metal part and the plurality of second metal parts has at least two portions exposed outside the insulating shell.

3. The high-frequency connector assembly of claim 2, wherein the at least two portions of the at least one first metal part and the plurality of second metal parts are grounded.

4. The high-frequency connector assembly of claim 3, wherein the insulating shell is joined by a male insulating shell and a female insulating shell, and respectively corresponds to the male terminal and the female terminal of each connection terminal group.

5. The high-frequency connector assembly of claim 4, wherein each of the at least one first metal part and the plurality of second metal parts are joined by a male metal body and a female metal body, and respectively corresponds to the male terminal and the female terminal of each connection terminal group.

6. The high-frequency connector assembly of claim 1, wherein the high-frequency connector assembly is used to transmit a high-frequency signal, a distance between the at least two metal pieces of each second metal part is at least 0.07λ, wherein λ is a wavelength of the high-frequency signal.

7. The high-frequency connector assembly of claim 1, wherein each of the at least one first metal part and the second metal parts are grounded.

8. The high-frequency connector assembly of claim 1, further comprising:

a metal shell substantially covering the insulating shell.

9. A high-frequency connector assembly, comprising:

a male connector, comprising:

a male insulating shell carrying a plurality of male terminals, wherein the plurality of male terminals are arranged along a first direction;

at least one first male metal body extending along the first direction and disposed between the plurality of male terminals; and a plurality of second male metal bodies extending along a second direction and disposed between the plurality of male terminals, wherein each of the second male metal bodies includes at least two metal pieces, and the at least two metal pieces are not connected to each other; and a female connector having a joint structure corresponding to the male connector, the female connector comprising:

a female insulating shell carrying a plurality of female terminals, wherein the plurality of female terminals are arranged along the first direction;

at least one first female metal body extending along the first direction and disposed between the plurality of female terminals; and a plurality of second female metal bodies extending along the second direction and disposed between the plurality of female terminals, wherein each of the second male metal bodies comprises at least two metal pieces, and the at least two metal pieces are not connected to each other;

wherein the plurality of female terminals and the plurality of male terminals are in contact with each other to transmit signals; the at least one first male metal body and the plurality of second male metal bodies are not in contact with each other, the at least one first female metal body and the plurality of second female metal bodies are not in contact with each other.

10. The high-frequency connector assembly of claim 9, wherein the at least one first male metal body and the at least one first female metal body are joined correspondingly to each other to form a first metal shield, and the plurality of second male metal bodies and the plurality of second female metal bodies are joined correspondingly to each other to form a plurality of second metal shields when the male connector and the female connector are in contact with each other.

11. The high-frequency connector assembly of claim 10, wherein the first metal shield and the plurality of second metal shields are grounded.

12. The high-frequency connector assembly of claim 9, wherein the female connector further comprising a female metal shell substantially covering the female insulating shell.

13. The high-frequency connector assembly of claim 9, wherein the male connector further comprising a male metal shell substantially covering the male insulating shell.

14. The high-frequency connector assembly of claim 9, wherein the at least one first male metal body and the plurality of second male metal bodies are disposed in the male insulating shell.

15. The high-frequency connector assembly of claim 9, wherein the at least one first female metal body and the plurality of second female metal bodies are disposed in the female insulating shell.

16. The high-frequency connector assembly of claim 9, wherein the high-frequency connector assembly is used to transmit a high-frequency signal, a distance between the at least two metal pieces of the second male metal bodies is the same as a distance between the at least two metal pieces of the second female metal bodies, which are both at least 0.07λ, wherein λ is a wavelength of the high-frequency signal.

* * * * *